Feb. 14, 1928.
A. P. EKVALL
1,659,522
ARTICLE FEEDING AND PROPELLING MEANS FOR
LABELING MACHINES AND THE LIKE
Original Filed April 29, 1926    6 Sheets-Sheet 1
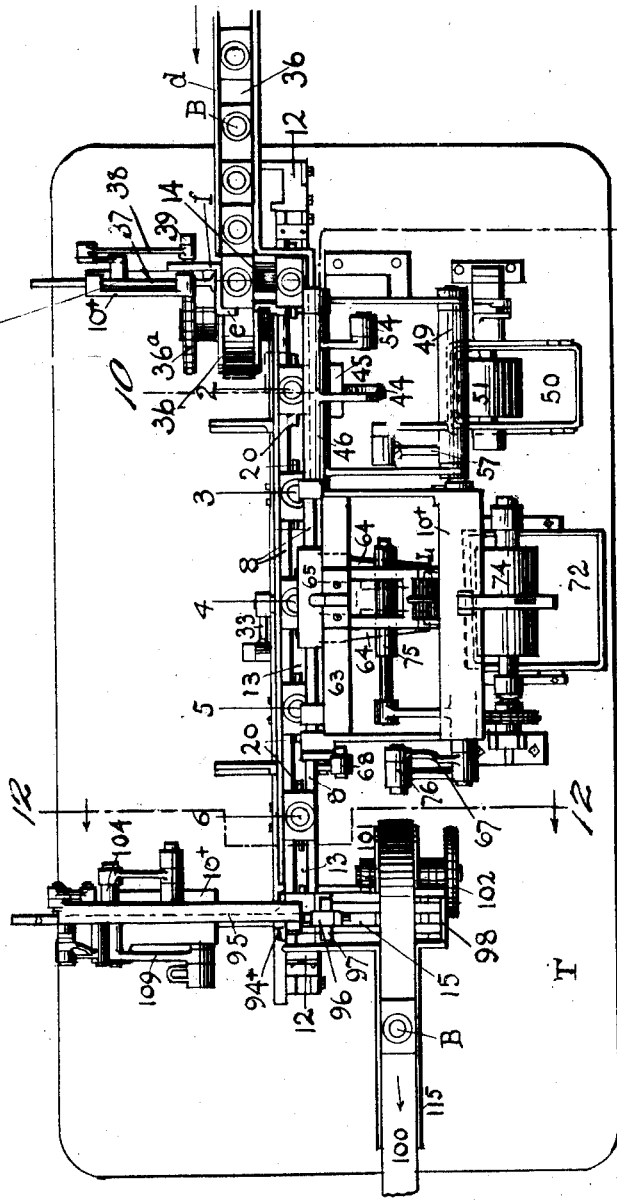
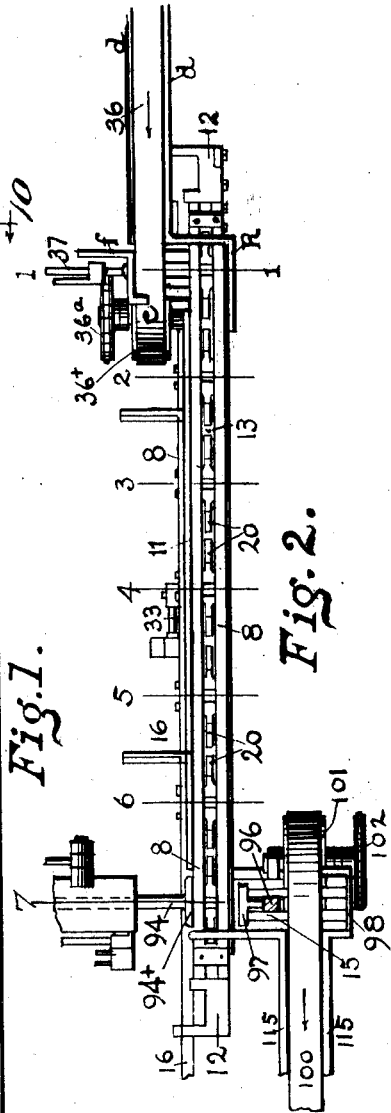
INVENTOR
Arvid P. Ekvall,
By Chas. H. Burleigh
ATTORNEY Feb. 14, 1928.  
A. P. EKVALL  
1,659,522  
ARTICLE FEEDING AND PROPELLING MEANS FOR  
LABELING MACHINES AND THE LIKE  
Original Filed April 29, 1926  6 Sheets-Sheet 2
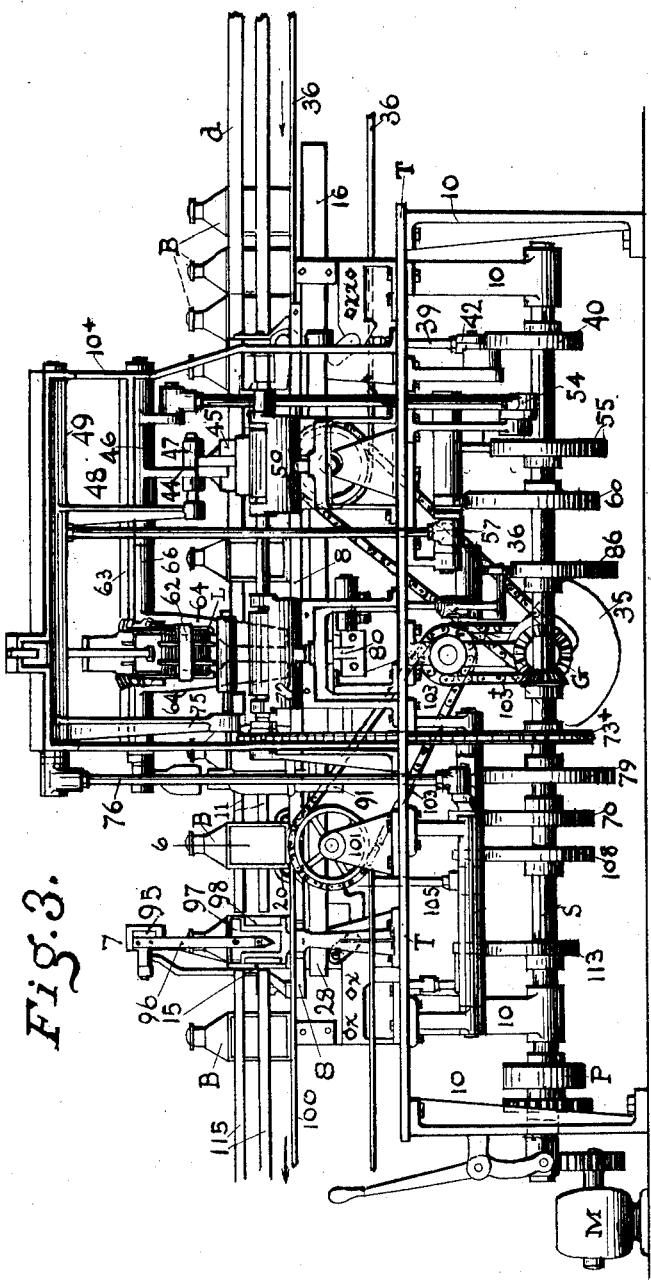
INVENTOR  
Arvid P. Ekvall,  
By Chas. H. Burleigh  
ATTORNEY Feb. 14, 1928.
1,659,522
A. P. EKVALL
ARTICLE FEEDING AND PROPELLING MEANS FOR
LABELING MACHINES AND THE LIKE
Original Filed April 29, 1926    6 Sheets-Sheet 3
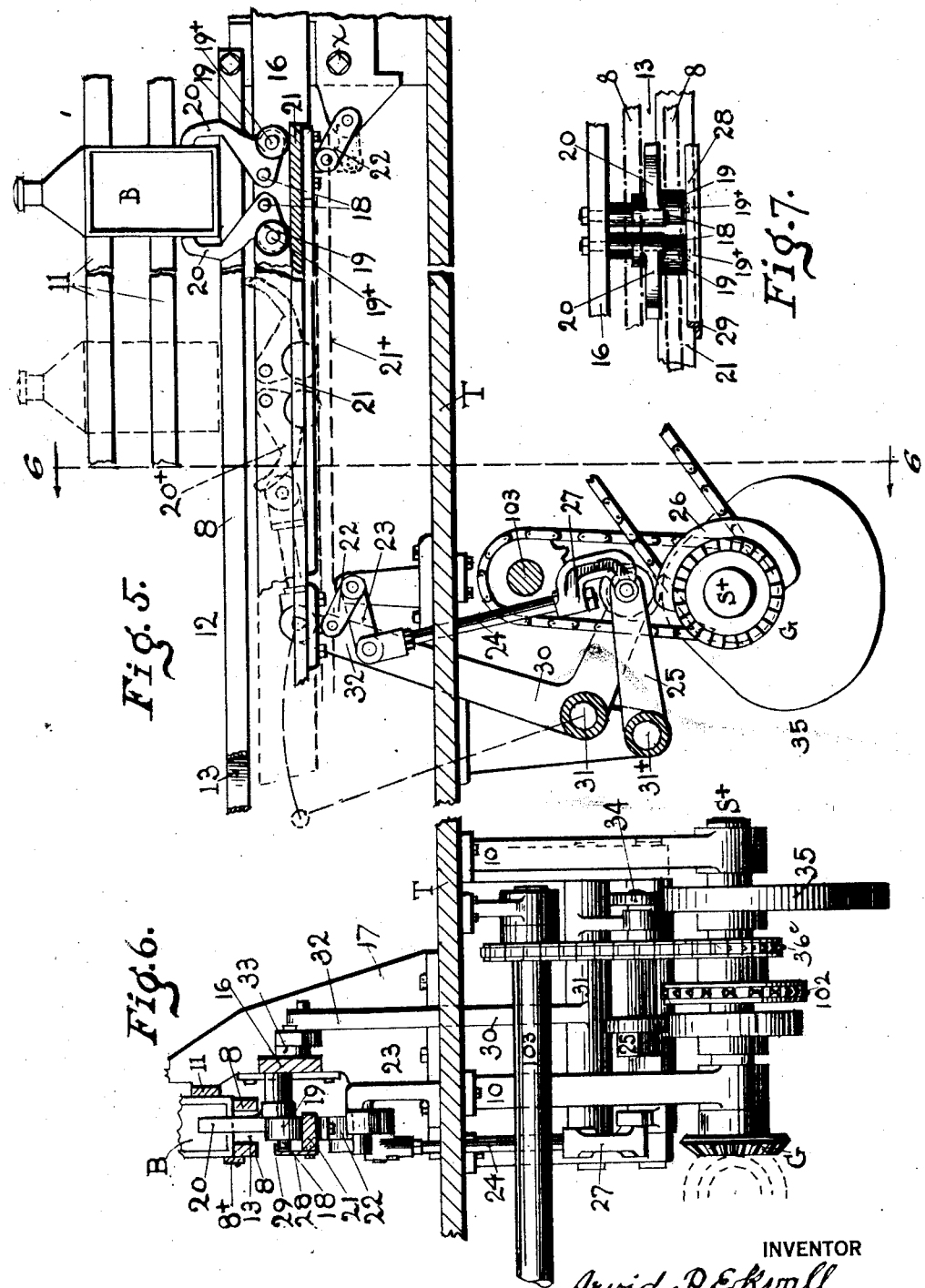
INVENTOR
Arvid P. Ekvall,
By Chas. H. Burleigh
ATTORNEY.

Feb. 14, 1928.
A. P. EKVALL
1,659,522
ARTICLE FEEDING AND PROPELLING MEANS FOR
LABELING MACHINES AND THE LIKE
Original Filed April 29, 1926    6 Sheets-Sheet 4
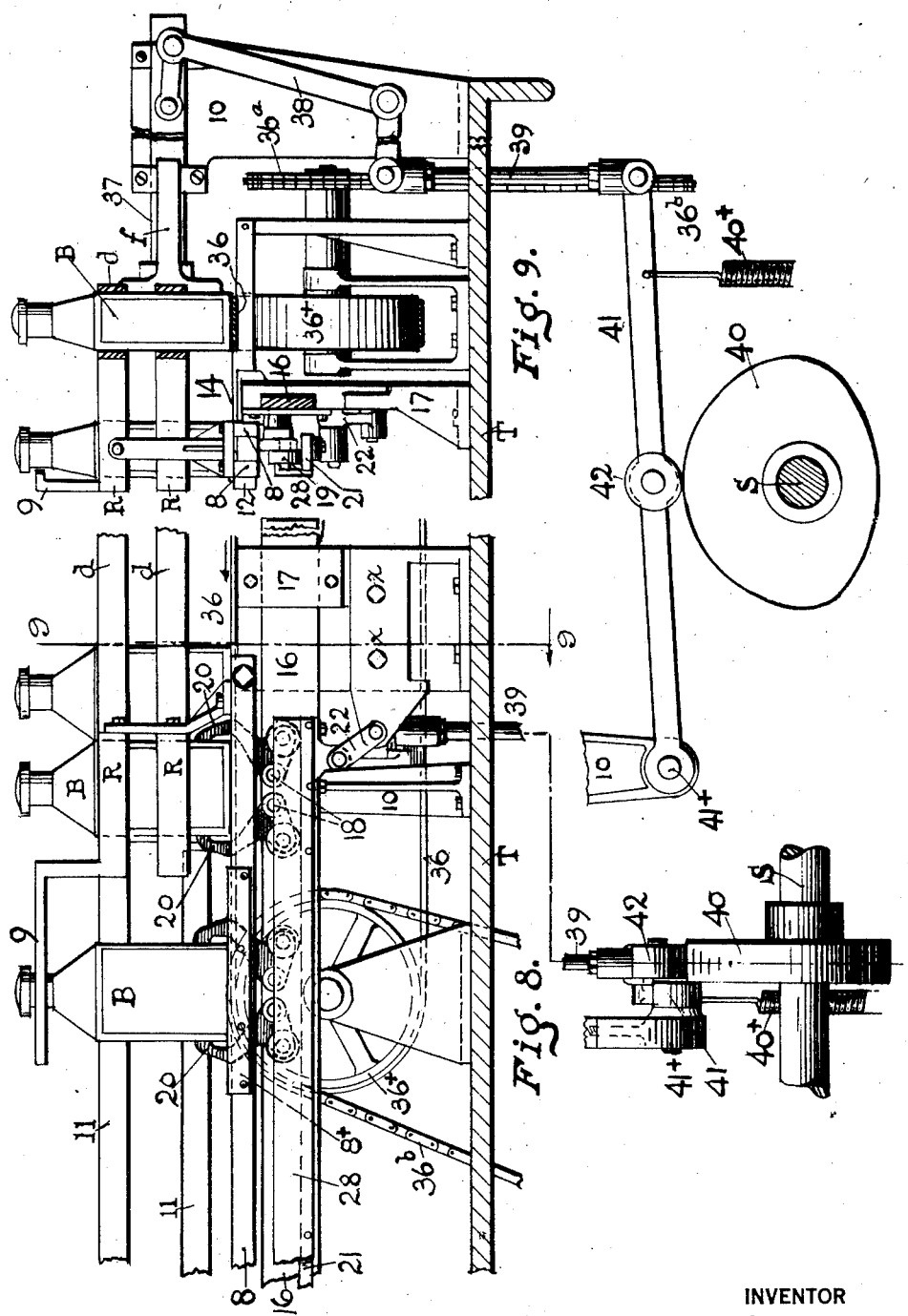
INVENTOR
Arvid P. Ekvall,
By Chas. H. Burleigh
ATTORNEY

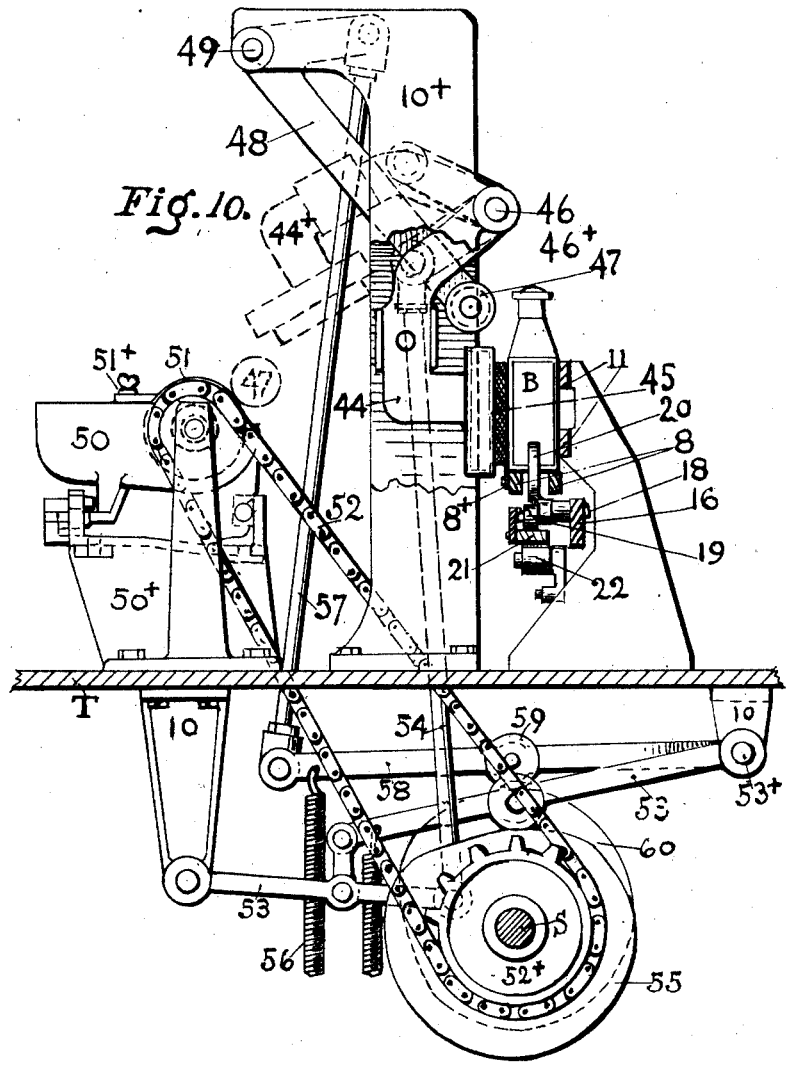

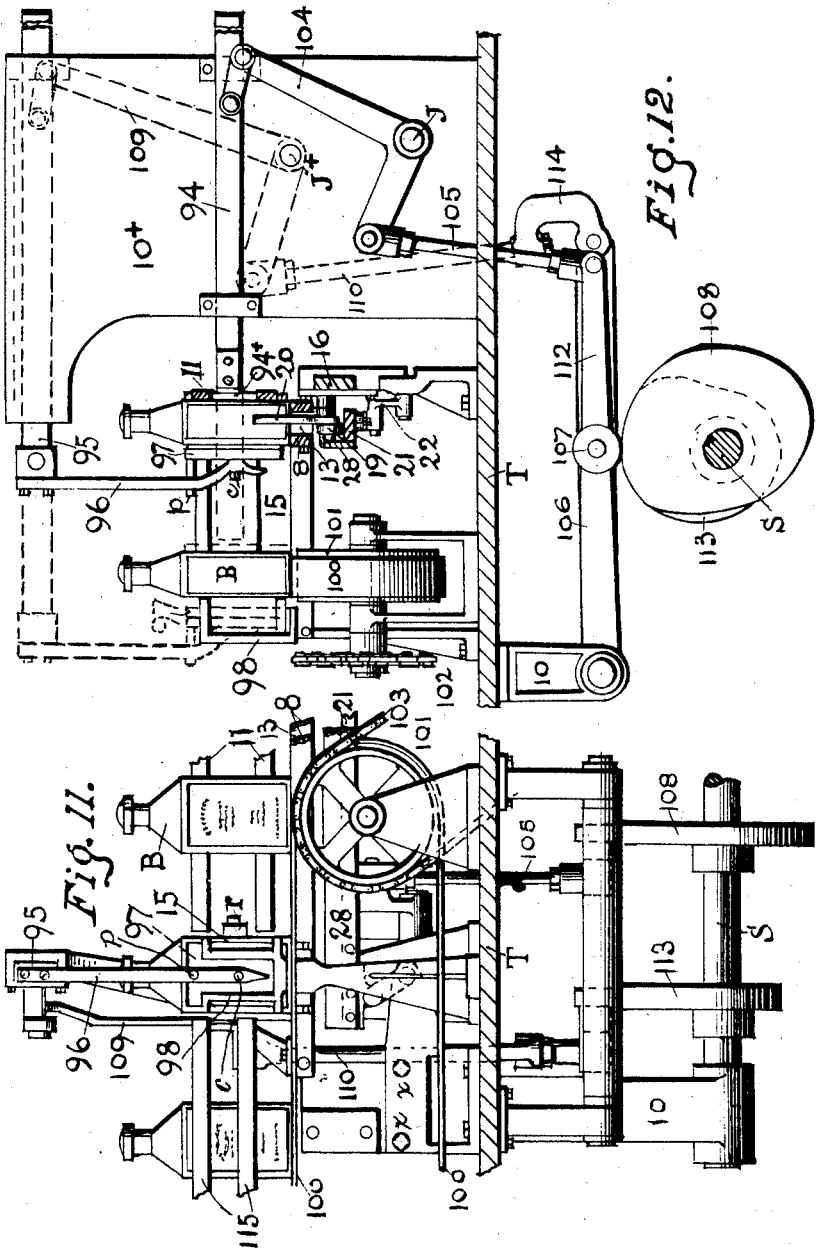

Patented Feb. 14, 1928.

1,659,522

UNITED STATES PATENT OFFICE.

ARVID P. EKVALL, OF WORCESTER, MASSACHUSETTS, ASSIGNOR TO ECONOMIC MACHINERY COMPANY, OF WORCESTER, MASSACHUSETTS, A CORPORATION OF MASSACHUSETTS.

ARTICLE FEEDING AND PROPELLING MEANS FOR LABELING MACHINES AND THE LIKE.

Original application filed April 29, 1926, Serial No. 105,467. Divided and this application filed November 17, 1926. Serial No. 148,951.

This invention relates to mechanism for supporting, automatically advancing and positioning articles such as bottles, cartons, cans and other containers or packages; and more especially to the adaptation of certain features and combinations in mechanism for advancing and positioning such articles for cooperation with label-applying means or the like; the present application being a division of my application Serial No. 105,467, filed April 29, 1926; the prime object being to provide an organized mechanism that will operate with successful efficiency, economically, and with desirable speed of action.

One feature of my invention consists in the improved means for supporting and advancing the bottles or articles to be labeled, whereby such articles or bottles, in upright standing relation and spaced serial order, are caused to slide, at predetermined intervals apart and by intermittent movements, along a stationary guideway whereon they are advanced from station to station by mechanism that simultaneously positively seizes each individual bottle or article at opposite sides thereof, moves the same from one station to the next, then releases them and returns to its primal position for taking the next bottle or article in the series, for repeating the movement.

A further feature consists in a system of mechanism including a dual-track runway, reciprocating series of uprising gripper claws arranged for oppositely gripping and advancing the bottles or articles and for retreating out of the way when releasing the article; also in the means for operating and controlling said series of gripper-claws.

Minor features of my invention are set forth and explained in the following detailed description; the particular subject-matter claimed being definitely expressed in the summary.

In the drawings, (six sheets) my invention is illustrated as embodied in a labeling machine for affixing labels to bottles, or other articles;

Fig. 1 represents a top plan view of the machine.

Fig. 2 is a separate plan view of the means for guiding and propelling the articles.

Fig. 3 is a front elevation of the machine.

Fig. 4 is a separate plan of the operating shaft and cams.

Fig. 5 is a sectional elevation showing detail of the propelling mechanism.

Fig. 6 is a transverse vertical section of the same at lines 6—6 on Fig. 5.

Fig. 7 is a fragmentary plan of the gripper-claws.

Fig. 8 is a front elevation of the entrance end of the runway, at position of the infeed mechanism.

Fig. 9 is a side elevation of the infeed mechanism; some parts shown in section at line 9—9 on Fig. 8.

Fig. 10 is a transverse vertical section at line 10—10 on Fig. 1.

Fig. 11 is a front elevation view at the position of the ejector passway.

Fig. 12 is a transverse vertical section at line 12—12 on Fig. 1, showing the means for passing the completed articles from the tracks to the discharge traveller.

The reference numerals and letters used in this illustration and description are the same as those used for indicating similar parts in my prior application, Serial No. 105,467; this application being for a division of the invention.

Referring to the drawings, the numeral 10 indicates the frame for supporting the working mechanisms in suitable relation for performing their functions in the manner intended. A bed or table T, as a part of the frame, is firmly supported upon legs or standards at convenient height. S indicates an operating shaft, or cam-shaft, arranged beneath the table and rotatable in suitable bearings. Motive power may be applied to said shaft from an electric motor M, or by any suitable arrangement of belts or gears from some convenient source of power. S$^+$ indicates a transversely disposed shaft operatively connected with shaft S by beveled gears G and carrying cams and sprockets for operating parts of the mechanism as hereafter described.

In the present application the mechanism is illustrated as operating upon square shaped bottles; but it will be understood that the mechanism is intended and adapted for operating upon other forms of bottles, and upon cans, containers, packages or other articles; therefore the term "bottle" or "article" as used in this specification is intended to include any kind of bottles, packages, containers or articles to which the mechanism is applicable, within the scope of the invention.

At a convenient location upon the frame or table T, there is arranged a run-way 12 for supporting and guiding bottles, or articles B, during their advancement through the machine, said runway comprises a pair of parallel track bars 8, with back guard rails 11, and propelling means of the character hereinafter described.

The dual track-bars are disposed with their top surfaces in the same plane, the two track-bars being secured together and supported at their ends, and arranged with a longitudinal intervening space 13 between the tracks, extending throughout their available working limit. The width of the runway approximately coincides with the width of the articles or bottles to be used thereon, which in practice preferably stand upright and slide upon the tracks 8, bridging across the intervening space 13, and guided above the track level by guard rails 11, which keep the articles B is uniform alinement.

The length of the trackway is apportioned to present a series of uniform predetermined intervals and stop stations; the latter being indicated on Figs. 1 and 2, by the lines 1, 2, 3, 4, 5, 6 and 7, which coincide with the intermittent movements of the feed-mechanism and timing of the successive actions in their operation.

The runway 12 is provided, at its receiving end, with a laterally arranged in-feed pass-way 14 at the rear side of the tracks, and at its delivery end, with a laterally arranged exit passway 15 at the front side of the tracks. These passways have their bottoms approximately in the same plane as the runway and are provided with suitable side guards for keeping the articles in proper alinement.

Parallel with and adjacent to the runway tracks, I provide an endwise reciprocating bar or member 16 supported, near the ends of the tracks, to slide in suitable guides or brackets 17 fixed upon the table T. Said bar 16 carries thereon a series of pairs of horizontally pivoted, oppositely swinging clutch-fingers or gripper-claws 20 that are located in alinement with the space 13, and have upwardly curved ends that swing up and down within said space between the two track-bars 8. The pairs of gripper-claws rock upon transverse pivot studs 18, supported firmly in the carrier-bar 16 and which are arranged quite near each other in each pair. Upon a lower projection on each of the gripper-claws there in a horizontally projecting stud 19+ upon which is mounted a free running roller 19 that serves both as an anti-friction traveler and as a counter weight for the claw.

The spacing from center to center of the pairs of gripper-claws corresponds with the spacing between the several stop stations 1, 2, 3, etc.

Beneath the entire series of gripper-claw rolls 19 and parallel with the track level, is an upwardly and downwardly movable bar or lifter member 21 upon which said rolls 19 rest and travel. Said bar is supported by rocking links 22, and limited up and down movement is imparted thereto, in the present instance, by an angle lever 23, a rod 24 connected with a pivoted arm 25 having a stud-roller that engages with and is actuated by a suitable cam 26 mounted upon the cross-shaft S+, that connects, by gears, G with the operating shaft S. The connection 24 is best provided with means 27, for adjustment of its length for accurately regulating the level of the bar 21, so as to close the gripper-claws 20, against the opposite surfaces of the bottle or article B with the desired degree of force.

When the lifter bar 21 is elevated to the position shown in full lines Fig. 5 the claws or grippers 20 are swung up and clasp the opposite sides of the article B above the track level, holding said article firmly in position for advancement along the tracks. Then when the bar 21 is lowered to the position indicated by dotted lines 21+, the claws or fingers 20 are caused to swing apart, and are retracted downward to a position below the level of the tracks, as indicated by dotted lines at 20+; thus releasing the bottles or articel B, which is left standing upon the tracks at the exact position of the stop station, while the bar 16 and gripper-claws 20 move back to primary position for seizing a bottle or article at the next preceding station. In like manner each pair of gripper-claws in the series is simultaneously operated to seize its respective article B, move it forward one step, releasing it there, then returning to take the next article in its order. Each pair of gripper-claws covering the space of one interval movement.

The weight of the rollers 19 may serve in some instances for opening or retracting the gripper-claws, but preferably a strip or plate 28, having a backward top offset or flange 29, is attached to the bar 21, said off-set overlying or engaging with the forwardly projecting ends of the studs 19+ whereon the rollers 19 are mounted; so that when the bar 21 is depressed the series of rollers 19 will be uniformly moved downward and all the gripper members 20 positively retracted.

The end faces of the gripper-claws are best fitted to properly seat against the bottle or article B, so as to contact therewith without undue shock. Said faces may, if in any instance so desired, be provided with a non-metallic covering.

The number of pairs of gripper-claws 20 upon the carrier-member 16 corresponds with the number of stop positions less one for the intermittent advance of the articles along the tracks or race-way, while effecting the reception, labeling and discharge of the article operated upon, such number may be more or less according to the requirements in any particular instance.

For reciprocating the gripper-carrier or slide 16 there is provided in the present instance, an angle-lever or member 30 rockably fulcrumed upon a shaft 31, supported in the under frame; said angle-lever having an upper arm 32 joined by a pivotally connected link 33 with the carrier-bar 16, and its lower arm provided with a roller 34 that engages an actuating cam 35 that revolves with the shaft $S^+$.

The bottles or other articles are received at the infeed end of the runway, and are propelled intermittently along the tracks, to the discharge end thereof; moving by successive stages from station to station, by the reciprocation of the bar 16 and gripper-claws carried upon said bar.

Adjacent the outer end of the infeed passway 14 there is a traveling belt or chain 36 passing around a pulley $36^+$ mounted upon an axle disposed in transverse relation to the runway tracks 8, to turn in bearings fixed upon the table T, and operated by a sprocket wheel $36^a$ and chain $36^b$ from a sprocket wheel $36^c$ mounted upon the operating shaft $S^+$. The top surface of the upper reach of said belt or chain is approximately level with the track surface of the runway; guard rails $d$ are located along the belt above its respective edges to keep the bottles or articles thereon in traveling alinement. The articles B are delivered by the belt at the end of the passway 14 and are then transferred to position on the runway tracks.

The means for transferring the bottle through the infeed passway onto the tracks 8 is best shown in Fig. 9. A guard rail formed with an angular offset is arranged at the front of the passway 14 to stop the articles on the line of the track 8, as they are shunted from the belt 36. The upper part of the guard may be horizontally extended as at 9 to prevent forward tipping of the bottle, as it is acted on at station 2. At the rear and above the belt level there is a horizontally reciprocating pusher 37, preferably provided with an angular head having at one side a forwardly projecting flange or lip $e$ that forms a stop for the train of articles B when the pusher is at its rearward position; and at its opposite side with a rearwardly projecting member $f$ that serves as a gate for arresting the oncoming train of bottles or articles while the pusher is performing its action. The pusher bar 37 slides in bearings on a suitable upright stationary bracket and is operated to move a distance equal to that required for shifting a bottle transversely from the line of the belt 36 to the line of the runway. In the present instance the pusher is actuated from a suitable cam 40, fixed upon the operating shaft S, through the agency of the angle-lever 38, connecting-rod 39, arm 41, fulcrumed upon the frame and carrying the cam-engaging roller 42.

The runway and feeding members including the tracks 8, carrier bar 16, gripper-claws 20, rollers 19, and gripper actuating bar 21 may be detached, as a unit, from the main machine, by removing the bolts X X that secure the respective ends of the track bars to their supporting brackets.

The mechanism for applying paste, gum, glue or other used adhesive substance to the surface of the bottle or article B, positioned upon the described run-way is, in the present illustration located at station 2. This mechanism is best shown in Fig. 10 and comprises a gum-applying pad 45, of the required size and shape, mounted upon a swinging arm 44 carried by an overhead fulcrum or rocker-shaft 46 supported by an upright frame secured upon the table T. The rocking axis is disposed above but approximately in same upright plane as the front side of the runway; the arm being suitably shaped to accommodate the combination. The arm 44 and pad 45 are arranged to swing downward on a plane transverse to the line of the runway, to bring the pad flatwise against the front of the article to be gummed, as indicated in full lines on Fig. 10, and to swing upward to the position $44^+$, indicated by dotted lines theron, for receiving its charge of adhesive from contact with a backwardly and forwardly moving transfer-roll 47 carried by a depending arm 48 attached to a rocking member 49, supported in the upper part of the frame $10^+$, and operated so that the face of the gummer-pad and transfer-roll move into contact.

A gum-supply reservoir 50 is removably supported upon a stand $50^+$ located upon the forward part of the table T, and is provided with a delivery-roll 51 rotated by a chain 52 and sprockets from the shaft S, and with the suitable film regulating means. The rolls 47 and 51 are axially parallel with the runway tracks. The transfer roll 47 passes from contact with the face of the gum delivery roll 51 to and across the face of the gummer pad 45 as the latter swings downward, thus charging said pad with a film of gum at each reciprocal action.

The gum-applying pad is preferably actuated by a rod 54 connecting a crank arm $46^+$ on the rocker 46 with a lever means 53 below the table and having a roller 54 that engages with a cam 55 upon the operating shaft S. The transfer-roll is operated to swing forward and back across the face of the pad by a rod 57 connecting an arm of the rocker 49, with a lever 58, carrying a roller 59 that engages with the cam 60, also mounted on shaft S; said cams being shaped to give the required co-active movement to the gummer-pad and transfer roll.

At the location where this gum-applying device 45 operates there is preferably provided a guard-strip 8+ attached to and projecting slightly above the track-bar. There is also provided an upper front guard 9 extending across the neck or upper part of the bottle or article. These guards are to prevent displacement of the article upon the tracks, by the suction of the gummer-pad when it is drawn away from the gummed surface.

A label-applying mechanism is arranged adjacent the side of the track-way, for gumming and affixing labels to the bottles or articles as they are successively fed into position therefor. Said mechanism in the present instance, is located coincident with stop-station number 4, but may be arranged at other determined station if in any instance so desired. Said label-applying mechanism is preferably of the character more fully illustrated and described in my application Serial No. 105,467. It comprises a label supply holder 62 for containing a pack of labels L, downwardly swinging label pickers 64 that take labels individually from the pack and present them adjacent to the article standing upon the runway tracks S.

A gum-supply reservoir 72 provided with a gum-delivery roll 74 a chain and sprockets for rotating the delivery roll, and a transfer roll 75 mounted upon a swinging arm 75+, for transferring gum or adhesive from said delivery-roll to the face of the pickers 64. The pickers are operated by suitable connections from a cam 70 upon the shaft S, and the transfer-roll 75 by a cam 79 upon said shaft.

An upwardly swinging grip-finger serves for stripping the label from the pickers and sticking a portion of it, more or less, to the surface of the bottle or article, to be later wiped or pressed securely thereon.

For transferring the bottles or articles B, from the tracks 8, through the exit passway 15 to a discharge belt 100, I provide a reciprocating pusher 94 mounted in guides upon a standing portion of the frame at the rear of the runway and in alinement with said exit passway. The pusher head 94+ is formed to seat against the back of the article, and to propel said article, individually, along the passway without materially changing its upright relation or turning it circumferentially, so that the articles are presented upon the moving belt 100 in approximately the same order as they are advanced along the runway tracks 8. The passway is provided with a suitable bottom and side guard rail r. An outstanding front guard or forked abutment member 98 is arranged at the forward end of the passway for arresting the forward movement of the bottle or article at the predetermined position in relation to the discharge belt.

Parallel with the pusher 94 I provide an endwise reciprocating bar 95 having attached to its front end an arm 96 carrying a presser-pad 97 approximately in line with but in oppositely facing relation to the pusher-head 94+ so that a freshly labeled article may be pressed between said pusher-head and presser-pad for smoothing the label in position. The presser is best loosely secured to its arm 96 by a stud c that permits slight tilting motion thereon and a slot and pin p prevents lateral rotation of the pad in respect to its square position upon the carrying arm.

The guard 98 is supported at stationary position and is formed so that it will not interfere with the movement of the presser 97, but will stop the article at a given position; permitting the presser pad to move a limited distance away from the face of the article before the pusher starts on its backward movement, thus leaving the articles entirely free but positioned upon the belt 100, to be taken away by said belt in due order.

The pusher-bar 94 in the present instance is pivotally connected to one arm of an angle lever 104 fulcrumed at J and having its other arm connected by a rod 105 with a lever 106 provided with a stud-roll 107 that engages with a suitably shaped cam 108 fixed on the operating shaft S.

The presser device 97 is independently controlled or actuated preferably by means of similar form, comprising an angle lever 109 fulcrumed at J+ its upper arm linked to the bar 95 and its lower arm connected by rod 110 with a lever 112 having a stud-roller that is engaged and actuated by a cam 113 mounted upon the shaft S.

The connecting members, as 110, are preferably provided with means 114 for adjustment of their length, for regulating the relation of the pusher 94 and presser 95 in respect to the position of the bottle or article B where different forms or sizes of articles are to be operated upon.

The discharge belt 100 is arranged at proper level for receiving the articles B from the passway 15 as they are ejected from the trackway by the pusher 94. The pulley 101 for said belt is operated by a sprocket-wheel 102 and chain 103 from a sprocket-wheel mounted upon the shaft 103+ which in turn is operated from a sprocket-wheel 201 on the shaft S+.

The traveling in-feed belt 36, the dual-track runway 12, and the traveling discharge belt 100, are severally disposed in parallel relation, or in the same general direction; but on different lines; the line of the in-feed belt being located some distance back from the line of the runway tracks, while the line of the traveling discharge belt 100 is located at some distance forward from the line of the runway tracks; as illustrated in Figs. 1 and 2. One belt 36 cooperating with the infeed mechanism and the other belt 100 with the delivery mechanism.

These traveling belts 36 and 100 may be respectively, of any convenient or required length, their outwardly extended portion being supported in any approved manner. Suitable guard rails 115 are provided along the sides of the discharge belts. This peculiar arrangement of the pad-way and traveling belts, in offset parallel order, with transverse passways as set forth, is a feature of improvement, that facilitates construction; utilization of space in floor area, and increases the speed efficiency of the machine in service.

The operation is as follows: The bottles or articles B to be labeled are placed upon the belt 36 in any convenient manner; the machine being in operation, the row of articles B move forward until the foremost is arrested against the flanged pusher head. The pusher then transfers the article through the passway 14 to an exact position upon the tracks at station 1. The pairs of gripper-claws 20, by the lifting of the bar 21, are caused to swing up through the space 13 and clutch the article above the tracks, uniformly and firmly between their ends, thereby accurately centering it in relation to the stop station position. The endwise movement of the gripper carrier 16 causes the pairs of gripper-claws 20, holding the article B, to move a distance equal to one space between the stop stations, thus sliding the articles respectively along the runway and stopping them exactly at their succeeding station. Lowering of the bar 21 then permits the gripper-claws to fall away fully releasing the article and leaving it standing in place while the slide bar 16 and pairs of gripper-claws return to primal position ready for repeating their action. In this manner the articles are fed along the runway intermittently one step at a time, each pair of gripper-claws serving to effect a movement from one stop station to the next. These movements are timed with a sufficient dwell at the stations to allow other parts of the mechanism to perform their respective functions.

At station 2 the gummer-pad 48, swings down and deposits a film of adhesive on the surface of the article and then retreats.

At station 3, in the present instance, no special action is effected.

At station 4, the pickers 64, having received a charge of adhesive and taken a label from the pack, swing down presenting the label adjacent the face of the article and the label is transferred from the pickers to the article by a suitable swinging finger grip.

At stations 5 and 6, there is no special performance in the present instance; but in some instances such stations may be utilized and occupied for any approved operation or service required.

At station 7, the bottle or article B with its label is embraced between the pusher head 94+ and presser pad 97 for smoothing on the label. The pusher and presser then together move forward carrying the article through the exit passway onto the belt 100. At the proper position the article is arrested by the abutment 98, while the presser-pad 97 continues to move a slight distance further, thereby leaving the article free to be carried away by the traveling discharge belt, while the pusher and the presser members move back to their primal position.

I claim—

1. In a machine for labeling articles of the character specified, means for supporting and advancing the articles, said means comprising a dual-track way having a central longitudinal space, an endwise reciprocating carrier-bar, moving parallel with said trackway, a series of pairs of oppositely swinging gripping members pivotedly supported on said carrier-bar, and adapted to swing up through said space for clutching the articles above the track-way, means for closing and opening the respective pairs of gripping members, means for reciprocating the carrier bar to move forward with the gripping members closed and backward with the gripping members open and retracted below the level of the tracks.

2. In a labeling machine, in combination with a straight dual-track runway whereon the articles to be labeled are slidably advanced by intermittent movement between a plurality of stop stations at regular intervals, means for propelling the articles along said runway consisting of a series of pairs of oppositely arranged adjacently pivoted gripper-claws their ends adapted to simultaneously swing upward uniformly to positively embrace opposite sides of the article above the plane of the tracks, and to swing down below the track level, a movable carrier having said gripper claws pivotably mounted thereon, means for reciprocating said carrier a distance equal to the distance between the stop stations, an upwardly and downwardly movable lifter bar controlling the swinging action of said series of gripper-claws, and means for independently actuating said lifter bar.

3. In a mechanism of the class described the combination of a rectilinear article-guiding runway comprising parallel stationary tracks adapted for supporting articles to slide thereon, means for moving the articles a pre-determined distance along said runway, including a parallel reciprocating carrier bar, oppositely arranged clutch members, pivotally mounted in pairs on said carrier-bar, each pair having oppositely clutching fingers, that swing into and from contact with the article, each clutch member having an offset heel furnished with a stud, and engaging roller thereon, means co-acting therewith for controlling the swinging action of said clutch fingers, and means for reciprocating said carrier-bar.

4. In a labeling machine, an article-guiding run-way including a pair of level topped stationary parallel tracks supported at their ends only, and having a narrow longitudinal space between them, gripping means projectable and retractable through said space for seizing, advancing and releasing an article in the plane of its movement, a reciprocating member having said gripping means rockably mounted thereon, and movable parallel with the run-way for a predetermined distance, means for reciprocally operating said members, means for controlling the gripping action to close and release at the respective limits of the reciprocal movements, comprising a vertically movable bar engaging with the individual gripping members, and actuating means for imparting movement to said bar.

5. In a labeling machine, means for supporting and directing articles comprising a dual-track runway having an intervening longitudinal space between the tracks, a series of pairs of oppositely disposed gripping members in line with the runway and swinging in the plane of said space, a parallel endwise reciprocating carrier member upon which said gripping members are individually adjacently pivoted in pairs, transversely journalled rollers mounted on the heads of the several gripper members, a movably supported parallel lifter-bar upon which said rollers rest, means for raising and depressing said lifter-bar, and means for reciprocating the carrier member in relation to the runway.

6. In a labeling machine, a straight article-guiding runway comprising parallel track bars disposed with a longitudinal open space between, and having level top surface whereon the articles are slidably supported bridging said space, means adjacent the ends of the tracks for connecting and supporting the runway, guard rails along the tracks, an endwise reciprocating carrier parallel to and adjacent the tracks, means for operating said carrier, a series of clutch members arranged in oppositely facing pairs but individually supported upon axis studs fixed in said carrier, said clutch members each formed with a projecting claw-like member adapted to pass up between the track-bars, an outstanding heel portion furnished with a laterally projecting stud having a roller mounted upon the stud, a movable lifter underlying the entire series of rollers, its ends supported upon the frame by rockable transversely pivoted link, a front plate attached to said lifter having means for engaging the projecting roller-axis stud, a cam on an operating shaft and connections therefrom to an arm on one of said rockable links, for actuating said lifter, and a cam on said shaft with connections for independently reciprocating said clutch carrier.

7. In a labeling machine, in combination with means for applying adhesive to the article and means for gumming and affixing a label thereto, an article-feed guideway including parallel longitudinal interspaced tracks, supported at their respective ends, and adapted for the slidable movement of articles thereon by intermittent advance and stop action, a plurality of clutch devices elevatable through said space for oppositely clutching the article above the track level, and retractable below said level, a carrier for said clutch devices movable parallel with the tracks, means for reciprocating said carrier the distance of one intermittent movement, means for operating the clutch members for gripping and releasing the articles, at the several stop stations, lateral pass-ways adjacent the ends of and connecting with said guide-way for the in-feed and exit of articles into and from said guideway, means for injecting articles individually at the infeed passway, and means for ejecting the articles at the exit passway.

8. In a labeling machine, including a longitudinal trackway for slidably supporting and presenting articles at predetermined stop stations along said trackway, and means for consecutively gumming the surface and means for affixing labels to said articles at determined stations thereon, a traveling infeed belt in parallel offset relation to the trackway for delivering articles to be labeled, a lateral infeed passway leading from said belt onto the trackway; a reciprocating pusher member for transferring the articles individually from said infeed belt to a first station position upon the trackway, said pusher member provided with an angular head that serves as a guard for positioning the transferred article and as a stop-gate for arresting the incoming train of articles upon the infeed belt, means for operating said belt, means for actuating said pusher member, and means for intermittently advancing the articles along the trackway.

9. In a machine, of the character described, a stationary dual-track runway having a longitudinal space between its tracks, a lateral infeed passway to the head-end of said runway, an infeed traveling belt cooperating with said infeed passway, a lateral exit passway from the foot end of said runway, a traveling discharge belt cooperating with said exit passway, article-gripping members for propelling articles intermittently along the runway, means for moving and controlling said gripping members, a reciprocating pusher for moving articles from the infeed traveling belt to the tracks, means for operating said pusher, a reciprocating pusher for moving articles from the tracks through the exit passway onto the discharge traveler, means for reciprocating said pusher; said traveler belts and runway tracks being arranged in the same general direction but on different alinement planes.

10. In machine of the character described a dual track runway having a longitudinal open space between its tracks and provided with a lateral entrance passway at one end, and a lateral exit passway at the other end, with side guards along the edges thereof, a plurality of pairs of grip-devices projectable through said space for gripping articles standing upon said tracks, a reciprocating member carrying said grip-devices, means for reciprocating the carrier and grip devices, means for operating the grip members to close for their forward movement and open for their backward movement, a traveling infeed belt passing adjacent said entrance passway for delivering thereinto, a traveling discharge belt adjacent said exit passway for receiving articles therefrom, means for moving articles individually from the infeed belt onto the runway tracks, and means for ejecting articles from the runway onto said discharge belt.

11. In a labeling machine, the combination of an article-supporting runway, means for successively advancing and stopping articles to be labeled along said runway, including a series of pairs of gripping members, a reciprocating operated carrier having said gripping members pivotally mounted thereon, means for controlling the action of said gripping members to clutch the article for its forward movement, and to release the same when moving backward, a lateral exit way from said runway coincident with the final stop-station thereon, and means for ejecting the labeled article through said exitway.

12. In a machine of the character described, in combination, a runway comprising dual tracks having an intermediate longitudinal space, pairs of gripper-claws that work up through said space and positively grasp the bottle or article above the tracks, a reciprocating carrier having said gripper-claws mounted thereon, means for moving said carrier parallel with the runway for a predetermined distance from stop to stop stations, imparting to said gripper-claws a moderately slow forward motion, a limited dwell at the stop station, and a quick return movement and means for lifting and closing the gripper-claws when at their primary stop station, and for opening and depressing said gripper claws when at their succeeding stop station.

ARVID P. EKVALL.